United States Patent
Hamid et al.

(10) Patent No.: US 7,137,008 B1
(45) Date of Patent: Nov. 14, 2006

(54) FLEXIBLE METHOD OF USER AUTHENTICATION

(76) Inventors: Laurence Hamid, 124 Pretoria Avenue, Ottawa, Ontario (CA) K1S 1W9;
Robert D. Hillhouse, 245 Irving Place, Ottawa, Ontario (CA) K1Y 1Z9

( * ) Notice: Subject to any disclaimer, the term of this patent is extended or adjusted under 35 U.S.C. 154(b) by 761 days.

(21) Appl. No.: 09/625,548

(22) Filed: Jul. 25, 2000

(51) Int. Cl.
*H04L 9/32* (2006.01)
*G06F 12/14* (2006.01)

(52) U.S. Cl. ............... 713/182; 713/186; 726/27

(58) Field of Classification Search ........... 713/170, 713/172, 176, 182, 183, 185, 186, 193, 194; 726/27; 707/9, 10; 711/163, 164; 705/69; 380/264, 278
See application file for complete search history.

(56) References Cited

U.S. PATENT DOCUMENTS

| | | | |
|---|---|---|---|
| 5,229,764 A | | 7/1993 | Matchett et al. |
| 6,193,153 B1 * | | 2/2001 | Lambert ............... 235/380 |
| 6,389,542 B1 * | | 5/2002 | Flyntz ............... 713/201 |
| 6,580,356 B1 * | | 6/2003 | Alt et al. ............... 340/5.8 |

2003/0097593 A1    5/2003   Sawa et al.

FOREIGN PATENT DOCUMENTS

| | | |
|---|---|---|
| EP | 1 050 790 A2 | 11/2000 |
| EP | 1 326 156 A2 | 7/2003 |
| GB | 2 329 499 A | 3/1999 |
| GB | 2 342 744 A | 4/2000 |
| WO | 99/50734 A1 | 10/1999 |
| WO | 01/65375 A1 | 9/2001 |
| WO | WO 01/82190 A1 | 11/2001 |
| WO | 03/062969 A1 | 7/2003 |

* cited by examiner

*Primary Examiner*—Justin T. Darrow
(74) *Attorney, Agent, or Firm*—Woodcock Washburn LLP

(57) ABSTRACT

A method of authorizing a user in communication with a workstation is disclosed. According to the method, a system automatically determines a plurality of available user information entry devices in communication with the workstation. The system then determines predetermined user authorization methods each requiring data only from available user information entry devices. The user then selects one of the determined authorization methods for use in user authorization. Optionally, each authorization method is associated with a security level relating to user access to resources. Once the authorization method is selected, the user provides user authorization information in accordance with a determined user authorization method and registration proceeds.

29 Claims, 6 Drawing Sheets

FLEXIBLE METHOD OF USER AUTHENTICATION

FIELD OF THE INVENTION

This invention relates generally to authorisation of individuals and more particularly relates to a method of authorising individuals based on an available authorisation method.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e. the combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords that are relatively insecure. As such, many systems protected by passwords are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterisation is well known and can involve many aspects of fingerprint analysis. The analysis of fingerprints is discussed in the following references, which are hereby incorporated by reference:

Xiao Qinghan and Bian Zhaoqi,: "An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, *An Automated Fingerprint Identification System*, NBS special publication, U.S. Department of Commerce/National Bureau of Standards, ISSN 0083-1883; no. 500-89, 1982;

Moenssens, Andre A., *Fingerprint Techniques*, Chilton Book Co., 1971; and,

Wegstein and J. F. Rafferty, *The LX39 Latent Fingerprint Matcher*, NBS special publication, U.S. Department of Commerce/National Bureau of Standards; no. 500-36, 1978.

Though biometric authentication is a secure means of identifying a user, it has not penetrated the marketplace sufficiently to be on most desktops. Further, since most forms of biometric authentication require specialised hardware, market penetration is slow and requires both acceptance of the new hardware and a pressing need.

Typical uses of user authentication include system access, user identification, and access to a secure key database.

Often a secure key database is encrypted with a key that is accessible through user authentication or identification.

Key management systems are well known. One such system, by Entrust® Technologies Limited is currently commercially available. Unfortunately, current key management systems are designed for installation on a single computer for use with a single fixed user authorisation method and for portability between computers having a same configuration. As such, implementation of enhanced security through installation of biometric input devices is costly and greatly limits portability of key databases. Password based protection of key databases is undesirable because of the inherent insecure nature of most user selected passwords.

For example, when using Entrust® software to protect a key database, the database is portable on a smart card or on a floppy disk. The portable key database is a duplicate of the existing key database. User authentication for the portable key database is identical to that of the original key database. The implications of this are insignificant when password user authentication is employed; however, when biometric user authentication such as retinal scanning or fingerprint identification are used, the appropriate biometric identification system is required at each location wherein the portable key database is used. Unfortunately, this is often not the case. In order to avoid this problem, organisations employ password access throughout and thereby reduce overall security to facilitate portability.

Alternatively, members of an organisation are not permitted to travel with portable key databases and thereby have reduced mobility and are capable of performing fewer tasks while outside the office. This effectively counters many of the benefits available in the information age.

In the past, a system was provided with a single available security system. Typically, prior art systems require a password. Alternatively, a system could require a password and a biometric, or another predetermined combination of user authorisation information. Unfortunately, passwords are inherently insecure. Further, because of the limited number of workstations equipped with biometric scanners and so forth, it is difficult to implement a system secured with biometrics. It would be advantageous to provide a method of user authorisation that is flexible enough to work on different workstations and to accommodate user needs of different users and at different workstations.

Another known system includes a key server. A key server is a single system that provides keys to individuals upon identification or authorisation. Such a system is useful in large organisations since it permits changing of system access codes without requiring every user to provide their personal key data storage device. Because of the extreme problems associated with losing secure keys, it is essential that a key server be backed up appropriately. Further, it is necessary that the server be available at all times. This is achieved through duplication of servers. Unfortunately, key servers are costly and this makes their implementation problematic in some instances. For example, a company performing a trial of a new user access system such a fingerprint identification system often purchases and installs only a handful of "test" workstations. Thus, to try out fifty (50) fingerprint scanners with a key server configuration requires two robust key servers having full backup capabilities, a main key server and a duplicate key server, and 50 fingerprint imagers. Since a fingerprint imager is likely to cost less than 10% of the cost of the servers, the additional cost is extremely undesirable. Eliminating a need for a duplicate key server would be highly advantageous.

OBJECT OF THE INVENTION

In an attempt to overcome these and other limitations of the prior art, it is an object of this invention to provide a method of automatically determining available user authentication methods and allowing users to access a system using available methods.

It is a further object of the invention to provide a method of storing security information with each of several authorisation methods, the information optionally being different for each method.

SUMMARY OF THE INVENTION

In accordance with the invention there is provided a method of authorising a user in communication with a workstation comprising the steps of: automatically determining at least an available user information entry device in communication with the workstation; determining user authorisation methods each requiring data only from available user information entry devices from a plurality of user authorisation methods; providing user authorisation information in accordance with one of the determined user authorisation methods; and, registering the user authorisation information provided against stored data to perform at feast one of identifying and authorising the user.

In accordance with the invention there is also provided a method of authorising a user in communication with a workstation comprising the steps of: providing a plurality of supported user authorisation methods and associated security levels for each user authorisation method; providing user authorisation information to the workstation; determining from the plurality of supported user authorisation methods an authorisation method requiring data only from the provided user authorisation information; and, registering the user authorisation information provided against stored data to perform at least one of identifying and authorising the user with the associated level of security.

In accordance with the invention there is further provided a method of authorising a user in communication with a workstation comprising the steps of: providing a plurality of user authorisation methods, some user authorisation methods requiring user authorisation information from more than one data input device; providing user authorisation information; registering the provided user authorisation information against data stored in a database of user authorisation data; when the data matches the stored data within predetermined limits, determining a security level for the individual in dependence upon the provided user authorisation information and the plurality of user authorisation methods; and, authorising user access within limits based upon determined security level.

Preferably, the at least an available user information entry device includes a plurality of available user information entry devices.

It is an advantage of the present invention that a user can gain access to a system using any of a number of user authorisation methods some of which may be available on some workstations and not at others.

It is a further advantage of some embodiments of the invention that convenient user authentication methods are usable unless a higher level of security is required.

BRIEF DESCRIPTION OF THE DRAWINGS

An exemplary embodiment of the invention will now be described in conjunction with the attached drawings, in which.

DETAILED DESCRIPTION

The invention is described with respect to passwords, tokens, and biometric verification in the form of fingerprint registration. The method of this invention is applicable to other verification processes as is evident to those of skill in the art.

One of the many problems with a fingerprint biometric is that a special contact-imaging device is required to image a fingerprint. Today, many systems and, in particular, many personal computers are not equipped with a contact imaging device. It is well known to outfit a network of workstations with biometric imaging devices in order to overcome these limitations. Unfortunately, for those who travel on business and need access to sensitive data in the form of network data or encrypted email, such a solution is not always possible and convenient. Another known solution is to travel with a portable contact-imaging device. Unfortunately, installation of special software and additional hardware expense is commonly required thereby rendering such an approach impractical. Also, many different biometric identification techniques are now known and available. It is impractical to install hardware and software in order to switch between verification methods. According to the invention, a method is proposed for providing a flexible authentication process that maintains security of an overall system without causing undue inconvenience or limitations.

Figure 1:
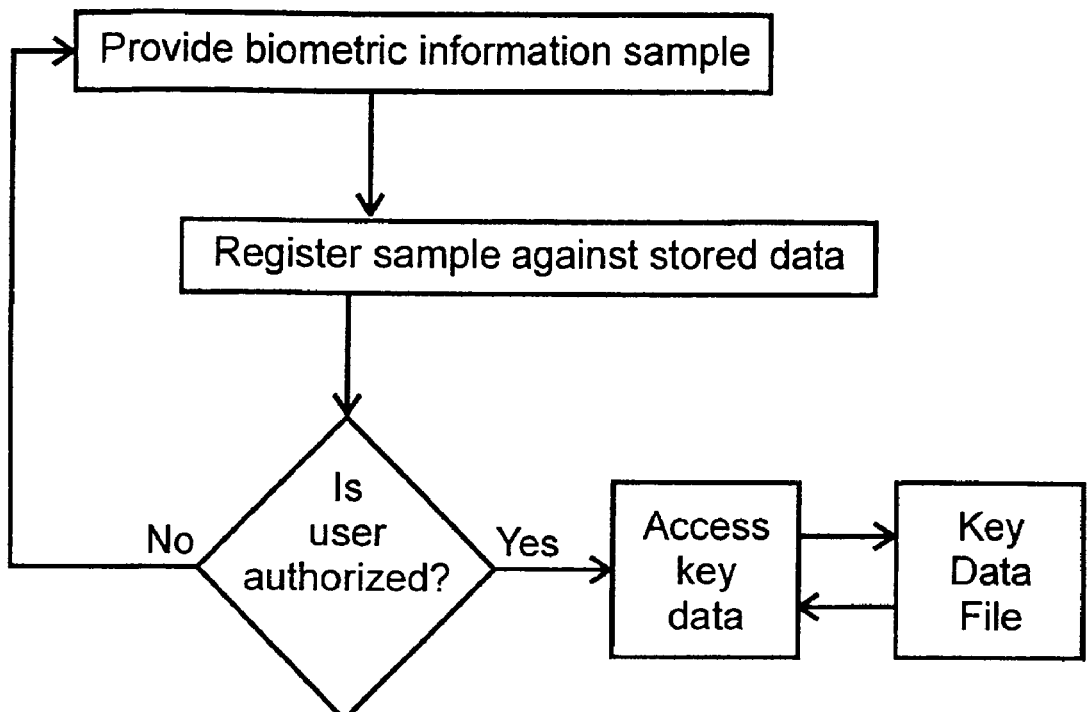
FIG. 1 is a flow diagram of a prior art method of accessing secured data.

Referring to FIG. 1, a simplified flow diagram of a prior art method of accessing secured data is shown for use in a network comprising a plurality of computers each having a biometric imaging means. A key data file comprises a cryptographic key, which is secured using a biometric authentication method. According to the method, biometric authentication is required to access the cryptographic key. For example, the cryptographic key is encrypted using a key secured by the biometric information. Upon presentation of appropriate biometric information, the secured cryptographic key is accessed, the cryptographic key is decrypted, and the decrypted cryptographic key is used to encrypt or decrypt data files. The method of accessing the cryptographic key is predetermined and is unchanging in nature.

Of course, other methods of securing cryptographic keys using biometric authentication are also applicable. For example, secure key locations may be determined by the user authentication process. Thus, if a key is secured using a fingerprint, access is through provision and analysis of a fingerprint and it is necessary to outfit each system wherein the user may require access to the key with appropriate fingerprint imaging hardware. Similarly, when the key is secured with a token, such as a smart card, the token interface must be installed on each system wherein the user may require access to the key. Presently, it is common to secure the key with a password since almost all systems are equipped with a keyboard. Unfortunately, passwords suffer from many security related disadvantages.

For convenience, key data files are typically transportable in the form of an encrypted data file containing the key data and security data necessary to access the encrypted data file. Unfortunately, each other computer system to which the key data file is transported must support a same authentication process in order to provide access to the key data file. For example, when the second computer has no biometric information input device, the user authorisation method for accessing the secured key can not be executed and the secured key is not accessible. Without the secured key, the encrypted cryptographic key data can not be accessed when desired. Alternatively, a method of extracting the keys from the key data file absent user authentication is necessary. Such a method is not desirable since it greatly reduces security. This exemplary problem is analogous to problems in network access, file access, network security, document authentication, and so forth.

Figure 2:
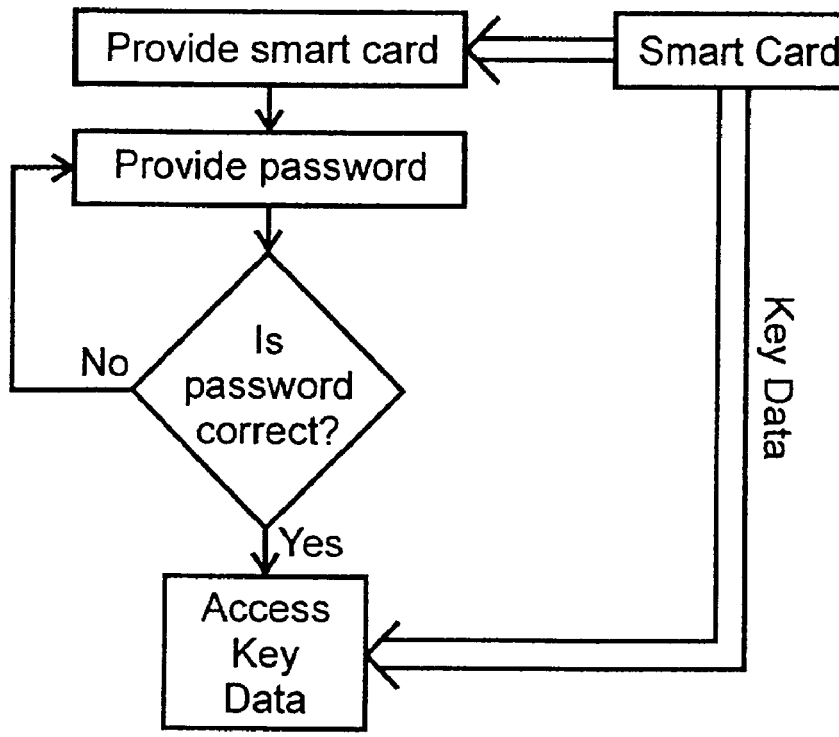
FIG. 2 is a flow diagram of a prior art method of accessing secured data.

Referring to FIG. 2, a prior art method of accessing secured data using a smart card based verification process but absent a biometric verification process is shown. Here, a password or card based user authentication is employed. A smart card having a key data file stored therein is placed into a smart card reader. A user is prompted for user authentication in the form of a password. Once the password is verified, access to the cryptographic key is permitted and encrypted data files are accessible. One such method is to employ the password or a predetermined portion thereof as a key for encrypting the cryptographic key. Another such method involves providing access to a secured key upon verification of the password and using the secured key to access the cryptographic key. As is evident to those of skill in the art, conventional key data files can not be transferred from a system employing a method, such as that of FIG. 1, to a system employing a different method, such as that of FIG. 2. Because of this, prior art systems are used in a less than optimally secure fashion wherein a single user authentication system in the form of passwords is used. Alternatively, transportability and remote access is reduced where biometric user authentication is conducted. Further alternatively, expenses are greatly increased in providing homogenous hardware and software base for all systems within an organisation.

Figure 3:
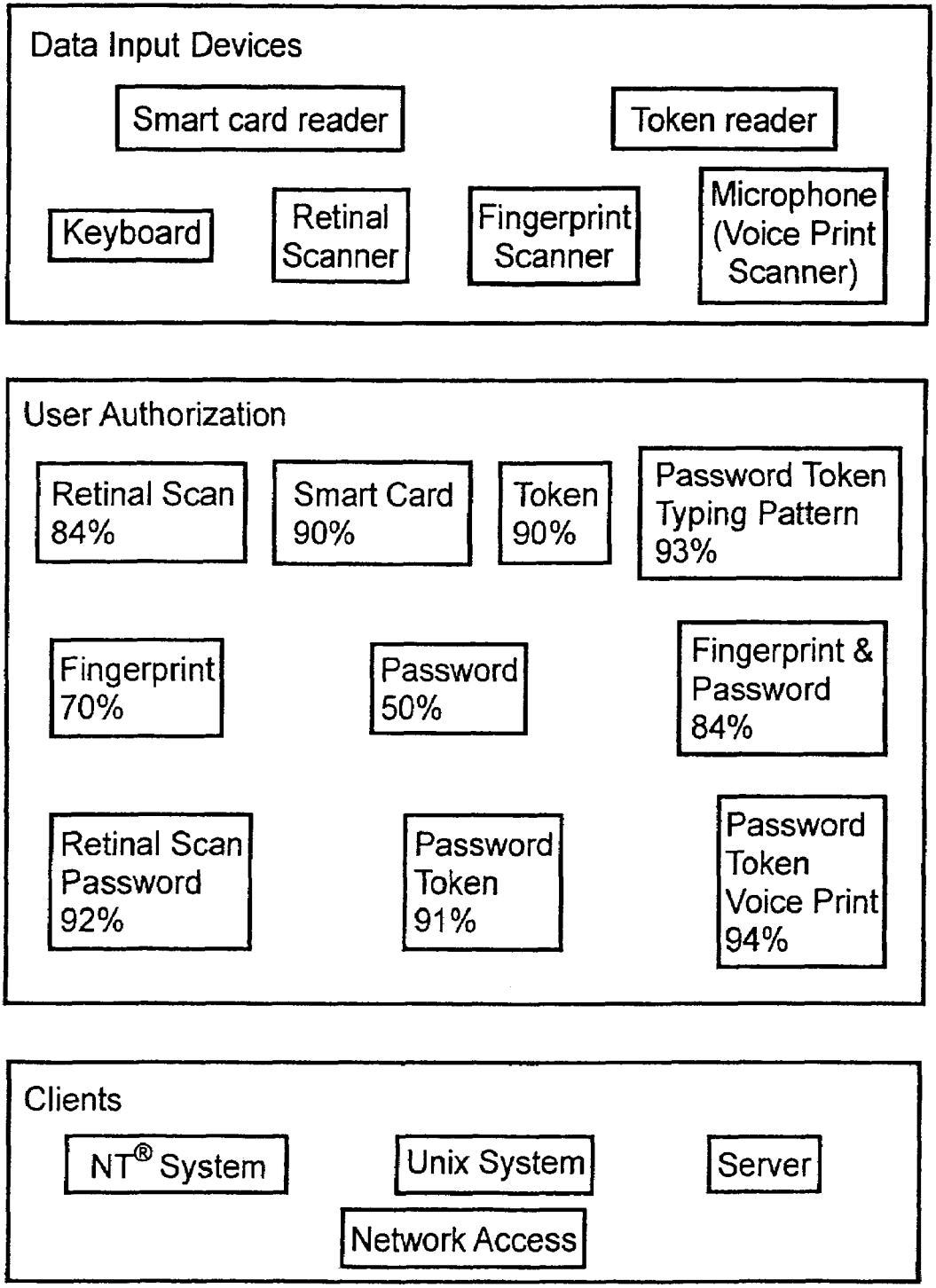
FIG. 3 is a block diagram of an exemplary system for user authorisation according to the invention.

Referring to FIG. 3 and in accordance with the invention, a simplified block diagram of a system for providing flexible user authorisation is shown. The system is provided with a user authorisation block, a plurality of clients and a plurality of data input devices. Typically, each data input device is capable of providing data for use in user authentication and, each client is capable of being accessed by at least some users. The user authorisation block includes several user authorisation sub-blocks. Each sub-block depends on a set of user data provided from one or more data input devices for performing a user authentication. Further, each sub-block relates to security data associated with the sub-block in the form of an estimated security level. A discussion of related security data is presented below.

Data input devices include biometric input devices in the form of a fingerprint imager in the form of a contact imager, a retinal scanner, and a microphone; a keyboard; a smart card reader; and a token reader. Other data entry devices including other biometric information gathering devices are also well-suited to use with the present invention. A careful review of the data input devices is useful in establishing advantages and/or disadvantages to each.

Biometric data input devices such as the retinal scanner, the fingerprint imager and the microphone are very convenient devices. A user need provide nothing other than portions of their person. Thus it is impossible to forget a code or an access card. That said, once a method of breaching security with a biometric input device is found, it is difficult if not impossible to correct because biometrics do not change. Also, due to health related issues or wear, biometrics are not always usable. For example, a scratchy throat results in a voice that may render a voice print unintelligible to a recognition system. That said, a biometric is generally considered to be a reliable data source for user identification.

The keyboard is the most common data input device for user authorisation. The keyboard is useful for entering codes and passwords. It is also known to use keystroke timing and typing speeds to identify individuals. These are known identification techniques. Unfortunately, passwords are inherently insecure and typing speed changes over time and is difficult to use in isolation to establish identification accurately.

Smart card and token readers allow for the use of access cards, analogous to keys, to provide user authorisation data. Like all access cards, these cards are prone to loss, theft and are often forgotten. It is advantageous to limit the effects of forgetting an access card without compromising system security. Since both tokens and smart cards are likely stored in a user's wallet, there is little security enhancement in using both together. It is also advantageous to limit the risk of a stolen wallet resulting in a security breach.

The user authorisation block shows a number of authentication methods alone or in combination. A quick review shows that a token and smart card are used interchangeably with the exemplary system. So are a fingerprint-password combination and a retinal scan. A Retinal scan-password combination and a fingerprint-smart card combination also have equivalent security levels. Thus, any of a number of user authorisation methods are available some of which are interchangeable—provide same security levels—for user authentication purposes. Of course, this need not be so. Each user authorisation method may have a distinct security level.

When a user forgets their smart card, they can still access the system using the retinal scanner and password and retain similar access privileges. Use of the retinal scanner may be less convenient, but is likely more convenient than returning home to retrieve the forgotten access card. Further, it is far more secure than having a user logged onto the system using someone else's access card or biometric information. Also, when the user is out of the office, they can still access any system using a password and token or a password-token-voiceprint. These require commonly available data input devices. Unfortunately, these may be difficult to use in some environments such as a noisy environment for the voice-print and so forth.

Related security data is typically implemented based on individuals and authentication method. Some users will have access to certain clients only when authenticated with an authentication sub-block believed to provide sufficient security for that client.

Alternatively, for each sub-block an estimated security level is provided and for each client a desired security level is provided. When a user is authorised with a particular sub-block they have access to resources requiring less security than that estimated as provided by the particular sub-block.

Further alternatively, users have access restrictions and there is also a further global access restriction such as estimated security levels or enumeration of sub-blocks and whether or not each is sufficient to allow access.

An exemplary use is now described with reference to the system of FIG. 3, and referring to the user list and other data of Table 1. A company has a key server for providing encryption keys to individuals for securing their email. Also, the corporation has an accounting system, a network (Novell), Windows NT Servers, Unix servers, and access to systems of contractors and contracts. For example, a military database is accessible for information relating to a research project being conducted for the military and a university database is accessible for data relating to a university project being conducted for the company.

| USER | General System | Personal Data | Accounting Data | Military Database | University Database |
|------|---------------|---------------|-----------------|-------------------|---------------------|
| User A | 60% | 84% | 90% | 93% | 40% |
| User B | 60% | 90% | 90% | N/A | 40% |
| User C | 60% | 93% | N/A | 93% | 40% |

A first user A arrives at the office in the morning. A has forgotten their identification card in the form of a smart card at home. Because of this, A identifies themself using a password and a biometric. The selected identification type is rated at 84% security level. A quick review of system security levels establishes that the individual is not capable of accessing highly secure information such as personnel files, corporate accounting records and so forth. They are, however, provided access to the general corporate data and the data network.

In the above example, the military database requires at least 93% security and therefore, the user authorisation block will not provide data to the military database to access it. Thus, when the user is working on a military related project, it is essential that they are provided with adequate methods of data entry or, alternatively, that they remember their access card.

Because of the flexibility of the system, many problems with prior art identification systems are obviated. For example, if employee A has been doing construction work, his hands may be damaged such that fingerprint data is not reliable. As such, he can select another form of authorisation data input for personal identification. Other examples include having a sore throat, forgetting an access card, and so forth. Thus the inherent flexibility of the system is extremely advantageous.

Figure 4:
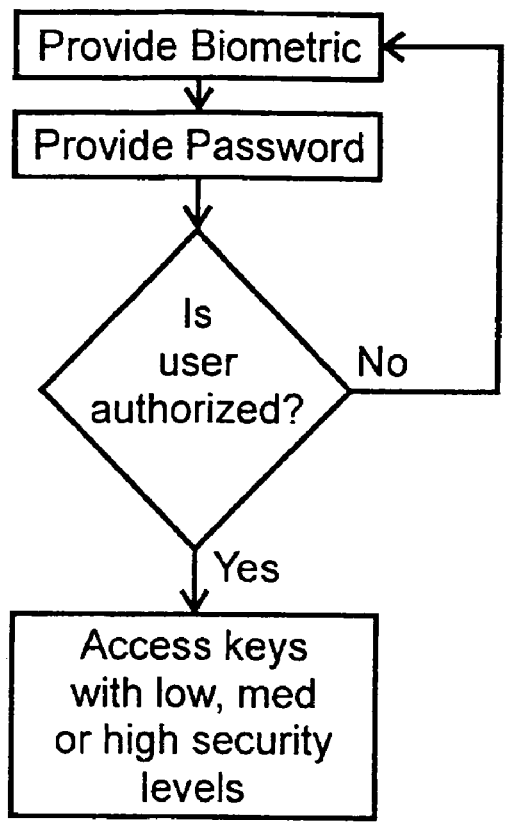
FIG. 4 is a simplified flow diagram of a method of accessing from a plurality of different locations key data stored within a portable medium.
Figure 4:
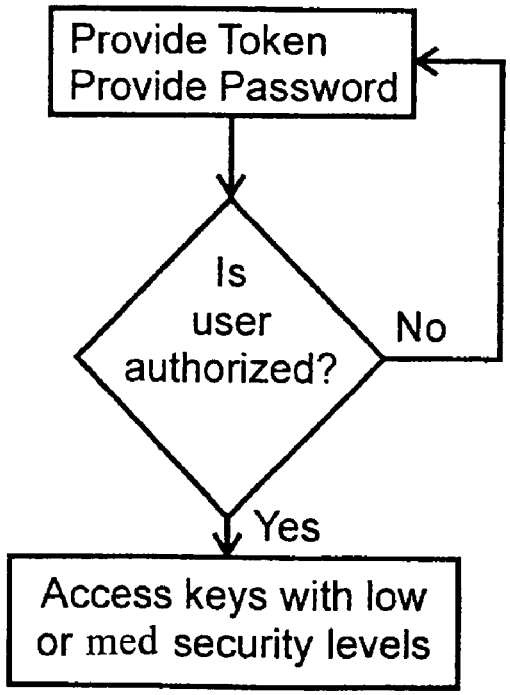
Figure 4:
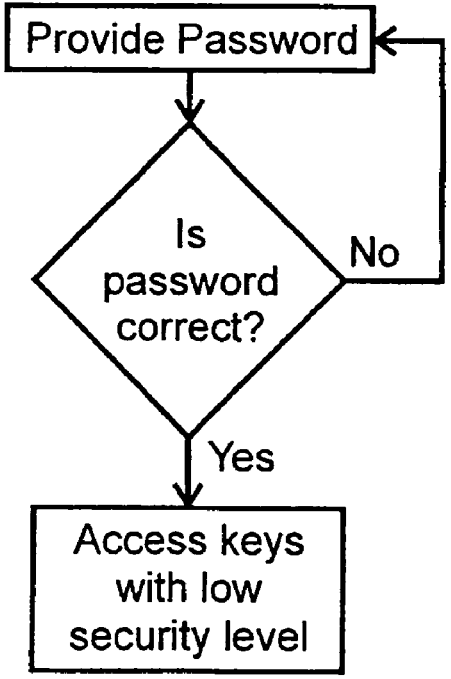

Referring to FIG. 4, a simplified flow diagram of a method of porting a key data file between different locations is provided. According to the diagram, a user is provided with a plurality of keys stored within a portable key data file and accessible upon user authorisation. At work, the user selects a user identification method in the form of biometric, token, and password. The user then identifies himself using his bimometric data, his token, and a corresponding password.

The combination is sufficient to provide the user with high level of security. As such, the user has access to data secured with key 1 and key 2. Typically, the user has access to all the keys in the key database when authorised with a highest level of security. Of course, this need not be so. At home, the same user has access to the key data file. Since, as shown, the user authorises himself with a password and a token, only keys with a medium security level or lower are accessible. Thus, for example, personnel files and accounting files as well as secure confidential files are inaccessible. Other work files and personal files are accessible. When the user is away, he authorises himself with a password only and, as such, only has access to the key having a low security level. Typically such a key will secure marketing data, already published data, unsecure data and an individuals own personal files.

Of course, when the individual is at a workstation having a token reader or a biometric input device, access to key 1 and key 2 is available as long as the access methods required are supported. This increases flexibility and, thereby improves overall usability of the security system.

According to a further embodiment of the invention, a method is provided for retrofitting existing security systems with the present invention in a novel fashion that increases overall security of existing systems. As noted above, passwords are inherently insecure because secure passwords cannot be easily remembered and insecure passwords are not secure. Many people use their children's names or dog's name for a password. Others use their own names or phone numbers. These are all easily "cracked" by hackers. A secure password is a random string of numbers and letters and characters some visible and some not. For example, "argH" CTRL(p) "Umm!23." is a difficult password to crack. It is also very difficult to remember.

Figure 5:
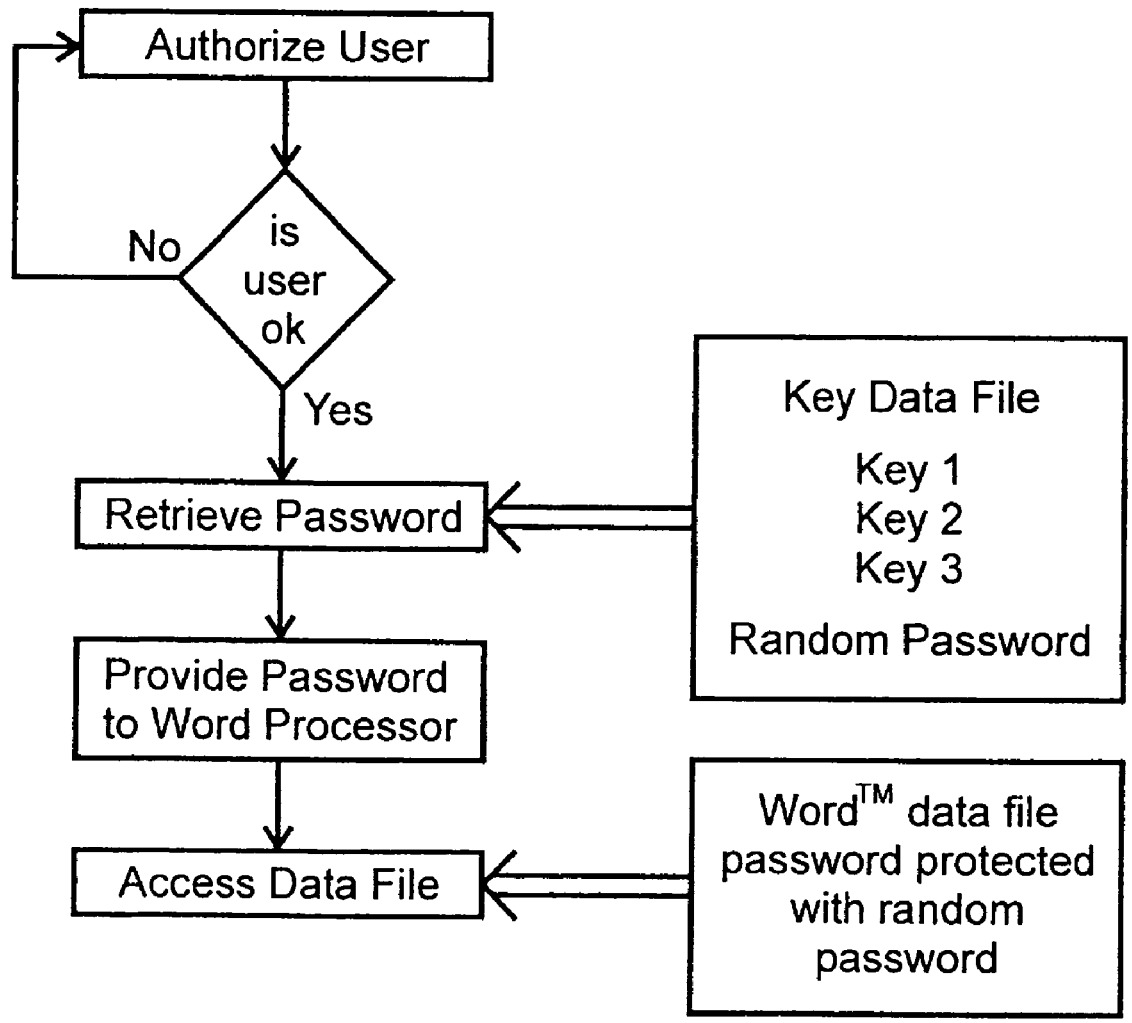
FIG. 5 is a simplified flow diagram of a method of providing upon user authorisation password data unknown to a user to a password security system for accessing a file or an application.

Referring to FIG. 5 and in order to overcome these difficulties, the invention provides a method of storing the secure password in a secure storage location such as a key database on a key escrow server or a key database on a smart card. Preferably, the password is unknown to the user. To access the password, the user authorises themselves according to the present invention. When the authorisation is of a sufficiently high security level to provide access to the password, the password is decoded and transmitted to the appropriate recipient authorisation process. The result is that a single user authorisation procedure is useful on a plurality of different systems even when those systems do not support the authorisation procedure directly.

To highlight the advantages of the above embodiment, an example follows with reference to FIG. 5. A Word® document can be stored "password protected." Often this is used to secure a document from unauthorised access. The passwords chosen are often insufficient to provide any real security. In order to provide significant security, a user selects password protect document and authorises themselves to provide the password to Word®. The document is stored password protected. The user does not need to know the password, which may be generated at random. When the user goes to access the document, the authorisation process is repeated and the password is provided to Word® to access the document. This also alleviates the problem with incorrect entry of password data, people looking over the shoulder of an employee as they enter their password and so forth.

A simple method of implementing the invention is to record a user's password entry during use and to play it back when the user is authorised. Though this is advantageous since it is more convenient than present user authorisation methods, it does not use the full potential of the present invention wherein the password is unknown to the users of the system. Because the passwords can be unknown to the users of the system and can be arbitrarily long and complicated, the method allows for conversion of existing password protected systems into more secure systems without causing undue user inconvenience, undue expense, and without requiring replacement of software applications with new software applications.

Figure 6:
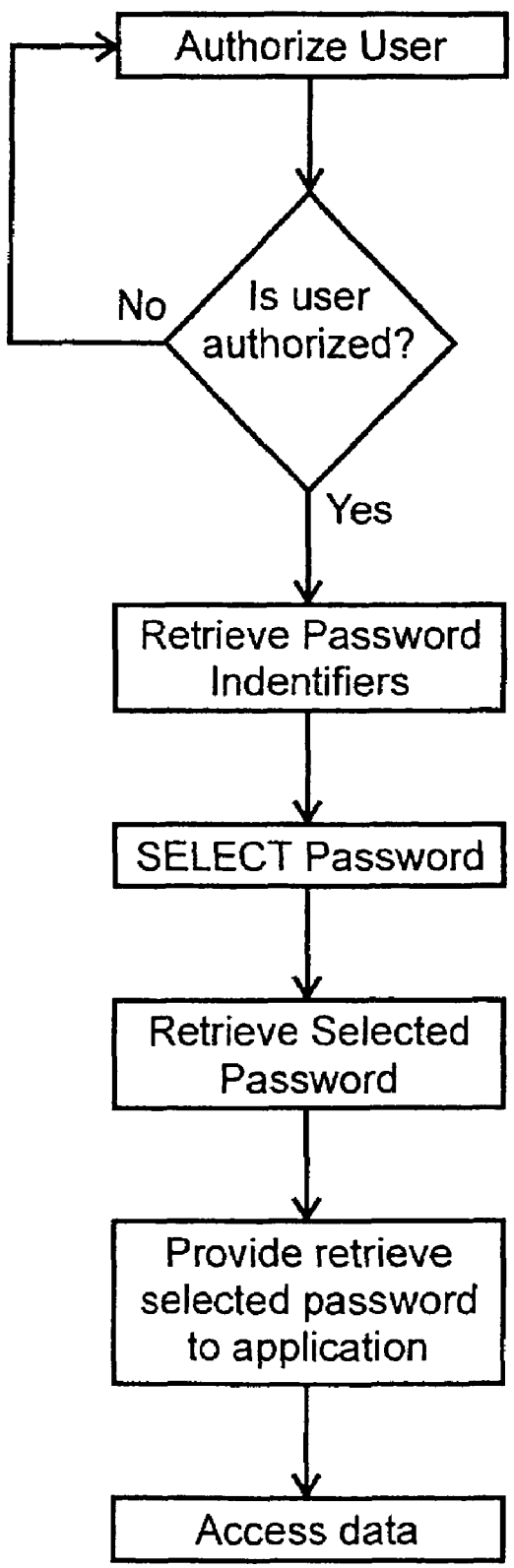
FIG. 6 is a simplified flow diagram of a method of providing one of a plurality of passwords to a password subsystem based upon a security level of a user authorisation method; and, FIG. 7 is a simplified flow diagram of a method of changing a password stored within a key data file and for securing a plurality of files or applications.

The system is expandable. Instead of a single password for an application or for all applications, users could be prompted to select the password they wish to access as shown in FIG. 6. This allows a user to secure some files with personal information using a first password and others using a company provided password. It also allows for a hierarchy of security levels each having a password.

Figure 7:
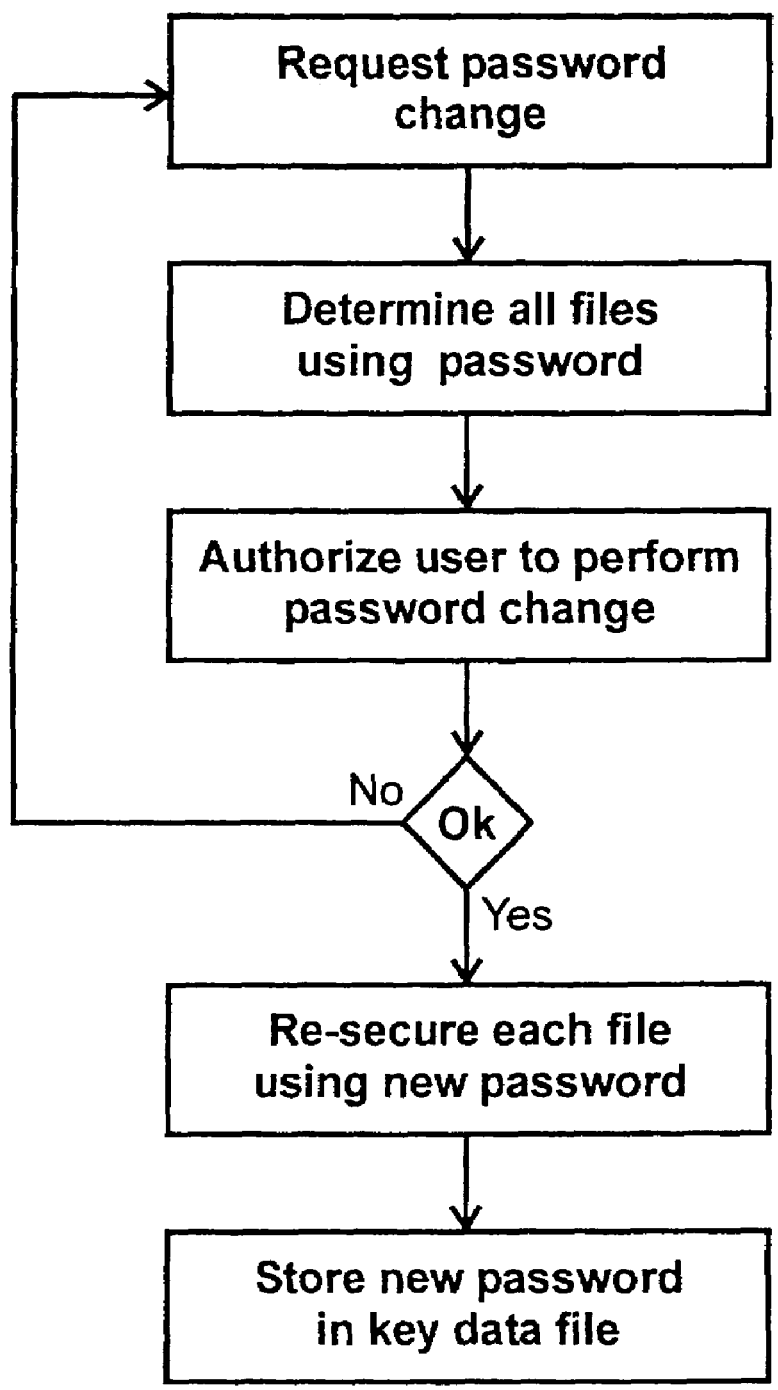

Referring to FIG. 7, by maintaining a list of where each password is used, the system can automatically change the password associated with each file, system and the passwords stored in the key database, when one is used. This allows for periodic updates of passwords to enhance security. It also allows for automatic update of passwords at intervals and for manual updates of passwords when a security breach is identified.

A password to be changed is identified. For example, the accounting password may have expired and may require updating. The user requesting a change of password is authorised. This involves prompting the user for information and comparing the received information against previously stored information to identify the user. Once authorised, a new password is automatically generated. Each data file secured with the password to be changed is identified, and is resecured using the newly generated password. The password to be changed is then archived or, optionally, destroyed. The generated password is stored in the key data file for future access. Optionally, instead of automatically generating the password, the user is prompted to provide a password. This is, in some ways less secure but may be desirable.

Numerous other embodiments may be envisaged without departing from the spirit and scope of the invention.

What is claimed is:

1. A method of authorising a user in communication with a workstation comprising:

automatically determining at least an available user information entry device in communication with the workstation;

determining user authorisation methods each requiring data only from available user information entry devices from a plurality of user authorisation methods;

providing user authorisation information in accordance with one of the determined user authorisation methods; and, registering the user authorisation information provided against stored data to perform at least one of identifying and authorising the user.

2. A method of authorising a user in communication with a workstation as defined in claim 1 wherein the at least an available user information entry device includes a plurality of available user information entry devices.

3. A method of authorising a user in communication with a workstation as defined in claim 2 comprising:

selecting from the determined user authorisation methods the one method wherein the provided user authorisation information is provided in accordance with the selected one method.

4. A method of authorising a user in communication with a workstation as defined in claim 3 comprising:
providing to the user a list of the determined user authorisation methods wherein selecting from the determined user authorization methods the one method comprises the user selecting from the provided list, a single user authorisation method.

5. A method of authorizing a user in communication with a workstation as defined in claim 4 comprising:
determining security information associated with the user and with the selected user authorisation method, the security information different for different user authorization methods.

6. A method of authorising a user in communication with a workstation as defined in claim 3 wherein each user authorisation method is associated with a security level and wherein registering the user authorisation information is performed to perform at least one of identifying and authorising the user within the associated level of security.

7. A method of authorising a user in communication with a workstation as defined in claim 1 wherein each determined method is supported absent further installation of software components.

8. A method of authorising a user in communication with a workstation as defined in claim 1 comprising retrieving a security key from a key storage location in dependence upon the registration.

9. A method of authorising a user in communication with a workstation as defined in claim 8 wherein the security key is an encryption key.

10. A method of authorising a user in communication with a workstation as defined in claim 8 wherein the security key is a password.

11. A method of authorising a user in communication with a workstation as defined in claim 1 comprising:
at intervals prompting an individual using the workstation to provide user authorisation information; and,
registering the user authorization information provided against stored data to perform one of providing access to secured data and denying access to the secured data in dependence upon the registration results.

12. A method of authorising a user in communication with a workstation as defined in claim 1 comprising:
upon access to secured data prompting an individual using the workstation to provide user authorisation information; and,
registering the user authorisation information provided against stored data in accordance with a user authorisation method to perform one of providing access to the secured data and denying access to the secured data in dependence upon the registration results.

13. A method of authorising a user in communication with a workstation comprising:
providing a plurality of supported user authorisation methods and associated security levels for each user authorisation method;
providing user authorisation information to the workstation;
determining from the plurality of supported user authorisation methods an authorization method requiring data only from the provided user authorisation information; and,
registering the user authorisation information provided against stored data to perform at least one of identifying and authorising the user with the associated level of security.

14. A method of authorising a user in communication with a workstation as defined in claim 13 comprising:
selecting from the provided user authorisation methods a method wherein the provided user authorisation information is provided in accordance with the selected method.

15. A method of authorising a user in communication with a workstation as defined in claim 14 comprising: at intervals prompting an individual using the workstation to provide user authorisation information according to the selected method; and,
registering the user authorization information provided against the stored data to perform one of providing access to secured data and denying access to the secured data in dependence upon the registration results.

16. A method of authorising a user in communication with a workstation as defined in claim 13 comprising:
determining security information associated with the user and the security level, the security information different for different user authorisation methods.

17. A method of authorising a user in communication with a workstation as defined in claim 16 wherein determining security information comprises retrieving a security key from a key storage location in dependence upon the registration.

18. A method of authorising a user in communication with a workstation as defined in claim 17 wherein the security key is an encryption key.

19. A method of authorising a user in communication with a workstation as defined in claim 17 wherein the security key is a password.

20. A method of authorising a user in communication with a workstation as defined in claim 13 comprising:
upon initiating access to secured data prompting an individual using the workstation to provide user authorisation information; and,
registering the user authorisation information provided against stored data in accordance with a user authorisation method to perform one of providing access to the secured data and denying access to the secured data in dependence upon the registration results.

21. A method of authorising a user in communication with a workstation comprising:
providing a plurality of user authorisation methods, some user authorisation methods requiring user authorisation information from more than one data input device;
registering the provided user authorisation information against data stored in a database of user authorisation data;
when the data matches the stored data within predetermined limits, determining a security level for the individual in dependence upon the provided user authorisation information and the plurality of user authorisation methods; and,
authorising user access within limits based upon determined security level.

22. A method of authorising a user in communication with a workstation as defined in claim 21 wherein user access is limited by limiting access to security keys based on the determined security level.

23. A method of authorising a user in communication with a workstation as defined in claim 22 wherein the security keys include encryption keys.

24. A method of authorising a user in communication with a workstation as defined in claim 23 wherein the security keys are stored within a portable storage medium.

25. A method of authorising a user in communication with a workstation as defined in claim 24 wherein access to some security keys is provided when a user is authorized according to a method of user authorisation but is denied when a user is authorized according to another method of user authorisation.

26. A method of authorising a user in communication with a workstation as defined in claim 22 wherein the security keys include passwords.

27. A method of authorising a user in communication with a workstation as defined in claim 21 comprising:
   selecting a user authorisation method from the plurality of user authorisation methods during execution; and,
   providing user authorisation information in accordance with the selected user authorisation method.

28. A method of authorising a user in communication with a workstation as defined in claim 21 comprising:
   automatically determining a presence or absence of user information entry devices in communication with the workstation, the user information entry devices including a keyboard, a card reader, and a biometric input device; and,
   determining user authorisation methods from the plurality of user authorisation methods that require data only from user information entry devices which are present.

29. A method of authorising a user in communication with a workstation as defined in claim 28 comprising:
   selecting a user authorisation method from the plurality of determined user authorisation methods; and,
   providing user authorisation information in accordance with the selected user authorisation method.

* * * * *

UNITED STATES PATENT AND TRADEMARK OFFICE
CERTIFICATE OF CORRECTION

| | | |
|---|---|---|
| PATENT NO. | : 7,137,008 B1 | Page 1 of 1 |
| APPLICATION NO. | : 09/625548 | |
| DATED | : November 14, 2006 | |
| INVENTOR(S) | : Laurence Hamid et al. | |

It is certified that error appears in the above-identified patent and that said Letters Patent is hereby corrected as shown below:

<u>Column 4,</u>
Line 28, delete "feast" and insert -- least --.

Signed and Sealed this

Twenty-fourth Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,137,008 B1 | Page 1 of 1 |
| APPLICATION NO. | : 09/625548 | |
| DATED | : November 14, 2006 | |
| INVENTOR(S) | : Laurence Hamid et al. | |

It is certified that error appears in the above-identified patent and that said Letters Patent is hereby corrected as shown below:

<u>Column 3,</u>
Line 58, after "such" insert -- as --.

<u>Column 4,</u>
Line 28, delete "feast" and insert -- least --.

Signed and Sealed this

Seventh Day of August, 2007

JON W. DUDAS
*Director of the United States Patent and Trademark Office*